United States Patent
Koegel et al.

(10) Patent No.: US 12,522,451 B2
(45) Date of Patent: Jan. 13, 2026

(54) CONVEYING DEVICE AND CONVEYING SYSTEM WITH SUCH A CONVEYING DEVICE

(71) Applicant: SOMIC VERPACKUNGSMASCHINEN GMBH & CO. KG, Amerang (DE)

(72) Inventors: Christoph Koegel, Prutting (DE); Josef Obermayer, Riedering (DE); Mathias Sickinger, Ampfing (DE)

(73) Assignee: SOMIC VERPACKUNGSMASCHINEN GMBH & CO. KG, Amerang (DE)

( * ) Notice: Subject to any disclaimer, the term of this patent is extended or adjusted under 35 U.S.C. 154(b) by 91 days.

(21) Appl. No.: 18/421,119

(22) Filed: Jan. 24, 2024

(65) Prior Publication Data

US 2024/0246779 A1 Jul. 25, 2024

(51) Int. Cl.
*B65G 54/02* (2006.01)
*B65G 17/44* (2006.01)
*B65G 47/00* (2006.01)

(52) U.S. Cl.
CPC ............. *B65G 54/02* (2013.01); *B65G 17/44* (2013.01); *B65G 47/00* (2013.01); *B65G 2201/0235* (2013.01)

(58) Field of Classification Search
CPC ......... B65G 54/02; B65G 47/00; B65G 17/44
USPC .............................. 198/867.15, 803.15, 805
See application file for complete search history.

(56) References Cited

U.S. PATENT DOCUMENTS

| | | | | |
|---|---|---|---|---|
| 4,742,778 | A | * | 5/1988 | Morishita ............... E01B 25/28 104/291 |
| 5,360,109 | A | | 11/1994 | Janota |
| 6,491,157 | B1 | * | 12/2002 | Kolling ................... B65G 17/42 198/803.14 |

(Continued)

FOREIGN PATENT DOCUMENTS

| CN | 115244837 A | 10/2022 |
|---|---|---|
| DE | 102014116232 A1 | 5/2016 |

(Continued)

OTHER PUBLICATIONS

European Application No. 23153079.1, Extended European Search Report mailed Jul. 20, 2023, 7 pages.

(Continued)

*Primary Examiner* — James R Bidwell
(74) *Attorney, Agent, or Firm* — Kilpatrick Townsend & Stockton LLP

(57) ABSTRACT

The invention relates to a conveying device for an object and to a conveying system designed using magnetic levitation technology with such a conveying device. The conveying device comprises a mover, which is movable relative to a movement surface of the conveying system, and a receptacle which can be connected to the mover. According to the invention, the mover comprises a locking unit and the receptacle comprises a counter-locking unit, which are arranged to be in locking engagement with one another in a locking direction. The locking unit further comprises at least one contact surface and the counter-locking unit comprises at least one counter-contact surface, which in the connected state are in form-fitting contact with one another in at least one form-fitting direction which is different from the locking direction.

20 Claims, 3 Drawing Sheets

(56) References Cited

U.S. PATENT DOCUMENTS

Figure 1:
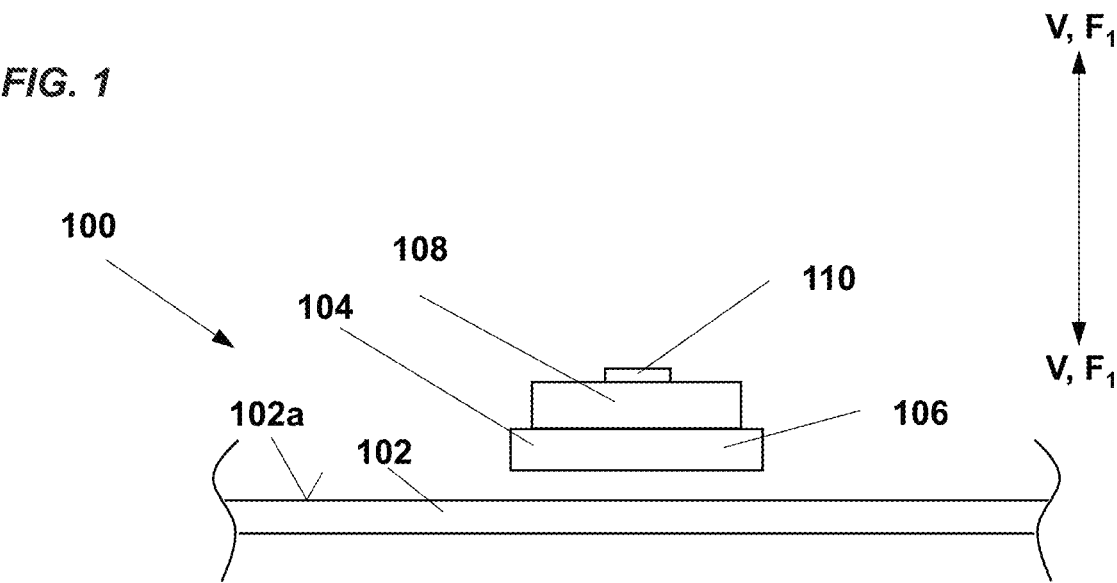

| | | | |
|---|---|---|---|
| 7,353,950 B2 | 4/2008 | Stahl | |
| 8,684,166 B2 | 4/2014 | Huff et al. | |
| 10,737,403 B2 | 8/2020 | Bauer et al. | |
| 2007/0268476 A1 | 11/2007 | Phillips et al. | |
| 2020/0030995 A1 | 1/2020 | Lu et al. | |
| 2023/0097926 A1* | 3/2023 | Hauer | H02K 41/02 |
| | | | 198/619 |
| 2024/0092516 A1* | 3/2024 | Seiffert | G07F 17/0092 |

FOREIGN PATENT DOCUMENTS

| | | | | |
|---|---|---|---|---|
| DE | 102013104423 B4 | | 10/2016 | |
| DE | 102015210052 A1 | | 12/2016 | |
| DE | 102017127329 A1 | * | 5/2019 | B65G 54/02 |
| DE | 102020205002 A1 | | 10/2021 | |
| EP | 0739834 A2 | | 10/1996 | |
| KR | 20120051414 A | | 5/2012 | |
| WO | 2020243814 A1 | | 12/2020 | |
| WO | 2024002473 A | | 1/2024 | |

OTHER PUBLICATIONS

European Application No. 23153080.9, Extended European Search Report mailed Jul. 20, 2023, 8 pages.
U.S. Appl. No. 8/421,134, Non-Final Office Action mailed on Jun. 24, 2025, 6 pages.

* cited by examiner

CONVEYING DEVICE AND CONVEYING SYSTEM WITH SUCH A CONVEYING DEVICE

CROSS REFERENCE TO RELATED APPLICATION

This application claims priority to European Patent Application No. 23153079.1, filed in Europe on Jan. 24, 2023, the entire contents of which are hereby incorporated herein by this reference.

The invention relates to a conveying device for an object not belonging to the conveying device, comprising a mover of a conveying system designed using magnetic levitation technology and not belonging to the conveying device, the mover being movable relative to a movement surface of the conveying system, and a receptacle which can be connected to the mover in a connecting direction and serves to receive the object.

From the applicant's international patent application PCT/EP2022/067894, it is known that a receptacle can be attached to a mover of a conveying system designed using magnetic levitation technology. However, it is not disclosed how the receptacle is attached to the mover.

US 2020/0030995 A1 also generally describes a device designed using magnetic levitation technology.

In view of the high purchase costs of movers, it is desirable to be able to detachably attach the receptacles to the movers so that they can be used together with a number of different receptacles depending on the nature and size of the object to be conveyed.

It is the task of the present invention to provide a constructive solution in this respect.

According to the invention, this task is solved by a conveying device of the type mentioned above, the mover comprising a locking unit and the receptacle comprising a counter-locking unit, the locking unit and the counter-locking unit being arranged to be in locking engagement with one another in a locking direction with the mover and receptacle in a connected state, and the locking unit comprising at least one contact surface and the counter-locking unit comprising at least one counter-contact surface which, in the connected state, lie against one another in a form-fitting manner in at least one form-fitting direction different from the locking direction.

In contrast to a screw connection between the mover and the receptacle, a snap-in connection is a type of connection that can be engaged and disengaged quickly. Furthermore, the form-fitting connection of the mover and the receptacle ensures that the receptacle cannot detach from the mover in an unwanted manner, even at the high accelerations and speeds achievable using magnetic levitation technology. The conveying speeds provided by the conveying system designed using magnetic levitation technology can thus be fully utilized.

A release mechanism can generally be provided or a tool used to release the locking engagement. To prevent unwanted disengagement of the locking connection between the locking unit and the counter-locking unit during use in the manner intended, it is advantageous if a disengagement force acting against the locking direction is greater than the product of the maximum acceleration of the mover in the locking direction and the sum of the masses of the mover, the receptacle and a maximum load on the receptacle.

With conventional conveying systems designed using magnetic levitation technology, movers can be accelerated in any spatial direction, for example at up to 30 m/s$^2$. To be able to absorb the resulting acceleration forces, particularly in the at least one form-fitting direction, the at least one form-fitting direction can extend in a plane orthogonal to the connecting direction.

If the locking direction extends in the connecting direction, only a short distance is available for establishing the locking engagement between the locking unit and the counter-locking unit. However, the distance available for establishing the locking engagement of the locking unit and the counter-locking unit can be increased by having the locking direction also extend in the plane orthogonal to the connecting direction.

This can also increase the holding force acting between the locking unit and the counter-locking unit. In addition, the forces required to hold the mover in position while the receptacle is released from the mover can be reduced. Finally, the tilting moment that occurs when the mover accelerates can be counteracted, thereby stabilizing the position of the receptacle relative to the mover connected to it.

The conveying device can move in all three spatial directions relative to the movement surface of the conveying system designed using magnetic levitation technology. However, movement in a plane parallel to the movement surface is usually the predominant movement direction. To be able to prevent unwanted disengagement of the mover and the receptacle from one another not only during a movement in a direction within the plane extending parallel to the movement surface, but also during any movement in this plane, the locking unit can comprise at least one further contact surface and the counter-locking unit can comprise at least one further counter-contact surface, which in the connected state can lie against one another in a form-fitting manner in a further form-fitting direction that differs both from the locking direction and from the form-fitting direction.

Unwanted disengagement of the mover and the receptacle from one another can also be prevented if, with respect to the connecting direction, the locking direction extends in the circumferential direction and the one form-fitting direction extends in the radial direction. The form-fitting connection of the mover and receptacle in the form-fitting direction extending in the radial direction secures the receptacle and the mover against unwanted disengagement in a plane extending orthogonally to the connecting direction. If a further form-fitting connection exists in a further form-fitting direction that is different from both the locking direction and the form-fitting direction, a form-fitting connection can be established in all three spatial directions of a Cartesian coordinate system, which counteracts the disengagement of the mover and receptacle during purely translational movement of the mover.

The risk of unwanted disengagement can be further reduced by the locking unit comprising at least one stop and the counter-locking unit comprising at least one counter-stop, which are adapted to interact in the connected state. If the stop and counter-stop interact in the locking direction, there is only a risk of unwanted disengagement in one unidirectional direction of the locking direction, while in the other unidirectional direction of the locking direction, unwanted disengagement is prevented by the interaction of the stop and the counter-stop.

In a further development of the invention, it is proposed that one of the units, the locking unit or the counter-locking unit, has an n-fold rotational symmetry about an axis of rotation preferably parallel to the connecting direction, where n is a natural number greater than or equal to 1, and that the unit comprises n locking arms each having a locking nose, wherein preferably an end of one of the locking arms on the locking nose side is arranged at a predetermined distance from an adjacent stop or adjacent counter-stop of the unit, the distance preferably extending over an angle of approximately $360°/(6-n)$ to approximately $360°/(4-n)$ about the axis of rotation. This means that only a simple rotary movement with little effort is required to lock the mover and receptacle together or unlock them. In particular, they can be released without any additional mechanism or the use of a special tool. The rotational symmetry also results in more even power transmission between mover and receptacle. Moreover, where n>1, there are several possible ways of arranging the mover and receptacle offset relative to each other in the circumferential direction and thus quickly locking them together. Advantageously, the axis of rotation runs through the center of gravity of the mover and/or the receptacle.

To further facilitate the rotary movement, the n locking arms can have a substantially curved shape, in particular being shaped like an arc of a circle. The locking nose can be arranged on an elastic bar, preferably at its end, which first deforms elastically to create a locking connection and then returns to its initial position when the locking unit and counter-locking unit engage with each other. It has been shown that an advantageous ratio between the rigidity of an individual locking arm and the required elasticity can be achieved, while at the same time reducing material fatigue, by providing exactly two locking arms.

To prevent unwanted disengagement of the mover and receptacle in the connecting direction, one of the units, the counter-locking unit or preferably the locking unit, may comprise an undercut, and the other of the units, the locking unit or preferably the counter-locking unit, may comprise a counter-undercut, whereby in the connected state the undercut and the counter-undercut can engage with each other in the connecting direction. During the transition to the connected state, the undercut can dip under the counter-undercut so that disengagement in the connecting direction can be prevented by the interaction of the undercut and counter-undercut.

To ensure optimized interaction and simple connection of the mover and the receptacle in this case as well, the undercut or the counter-undercut can be provided on at least one of the n locking arms, with the undercut or the counter-undercut extending over an angle around the axis of rotation that is smaller than or equal to the angle of its distance around the axis of rotation.

The engagement of the locking unit and counter-locking unit can be facilitated by one of the units, the locking unit or the counter-locking unit, being configured as a projection, and the other of the units, counter-locking unit or locking unit, being configured as a recess, the projection being at least partially received in the recess in the connected state. The recess can guide the relative movement with the projection when connecting the receptacle and the mover. This configuration can also reduce the risk of damage to the locking unit and the counter-locking unit in the connected state, as the recess protects the projection. In the case of a linear plug-in connection, the recess can be slot-shaped, for example. Where the locking direction extends in the circumferential direction, the recess can be at least partially substantially circular.

Advantageously, the locking unit can be configured as a projection projecting from the mover and the counter-locking unit can be configured as a recess provided on the receptacle. This makes it easy to store the receptacle, for example by stacking several receptacles on top of each other, without damaging the counter-locking unit.

At this point, it should be noted that the locking unit can be arranged on a side of the mover facing the receptacle and the counter-locking unit on a side of the receptacle facing the mover. The locking unit can be operationally stably and detachably connected to the mover, for example via a plug-in connection or via a screw connection or via a bolt connection. The counter-locking unit can also be operationally stably connected to the receptacle. However, in order to keep production costs low, the counter-locking unit can preferably be formed in one piece with the receptacle, for example by milling the receptacle and counter-locking unit from the same semi-finished product or by injection molding or using an additive manufacturing process.

To further prevent unwanted disengagement of the mover and the receptacle, the conveying device may comprise at least one further locking unit comprising a guide projection and a guide groove adapted to receive the guide projection, wherein one guide element, guide projection or guide groove may be arranged on the mover, and the other guide element, guide groove or guide projection may be arranged on the receptacle.

Furthermore, the provision of a guide projection and a guide groove can improve the positioning accuracy of the receptacle and mover relative to each other and reduce the risk of damage. This is particularly advantageous for movers and receptacles with a non-square base area or for a receptacle that is larger than the mover. Furthermore, the guide groove guides the guide projection during the transition of the mover and receptacle into and out of the connected state. To make it easier to insert the guide projection into the guide groove, the guide groove can have a lead-in chamfer. The guide groove can also be shaped so that it follows the movement of the locking unit and the counter-locking unit. If the locking unit and the counter-locking unit are locked by a linear movement, for example, the guide groove has a linear shape. If the locking unit and the counter-locking unit are locked by a rotary movement, the guide groove has a curved, preferably arc shape.

To further secure the connection between the mover and the receptacle against unwanted disengagement, the guide groove can have a stop at an end pointing away from an insertion end, which is adapted to lie against the guide projection in the connected state, a locking indentation preferably being formed in the guide groove upstream of the stop. The stop prevents further relative movement between the mover and receptacle beyond the stop. Upstream of the stop means that, upon locking, the guide projection first moves past the locking indentation before the guide projection reaches the stop or lies against the stop. The distance between the stop and the locking indentation is preferably less than or equal to the extension of the guide projection in the same direction of extension. During the locking of the mover and the receptacle, the guide projection moves away from the insertion end until the stop is reached.

The elasticity of a locking arm required for locking can lead to the disengagement of the at least one form-fitting connection. To counteract this, the guide projection and the locking nose can lie on a straight line that may intersect the axis of rotation.

To reduce interaction with the magnetic field of the conveying system designed using magnetic levitation technology and to minimize the control effort for controlling the conveying device, it is proposed that the locking unit and/or the receptacle is/are made of an electrically non-conductive and non-magnetizable material, preferably plastic. This plastic can be ABS, for example.

It should also be added that the relative positioning of the mover and receptacle in the disengaged state in preparation for locking (transition to the connected state) can be facilitated if one of the units, the locking unit or the counter-locking unit, comprises a positioning projection and the other of the units, the counter-locking unit or the locking unit, comprises a corresponding positioning opening which is adapted to receive the positioning projection. The positioning opening and/or the positioning projection can be arranged in a centroid of the corresponding area of the mover and/or the receptacle.

The further away the center of gravity is from the centroid of the area of the mover viewed from above, the greater the magnetic forces required to move the mover. To keep the center of gravity of the conveying device as close as possible to the mover, an extension of the locking unit in a direction orthogonal to the connecting direction can be greater than or equal to an extension of the locking unit in the connecting direction, and/or an extension of the counter-locking unit in the direction orthogonal to the connecting direction can be greater than or equal to an extension of the counter-locking unit in the connecting direction.

According to a second aspect, the invention relates to a conveying system designed using magnetic levitation technology, comprising a stator which has a movement surface. The conveying system according to the invention is characterized in that the conveying system comprises at least one conveying device according to an embodiment of the first aspect, the mover being movable relative to the movement surface.

With regard to the advantages that can be achieved with a conveying system according to the invention, reference is made to the foregoing discussion of the conveying device according to the invention. Furthermore, features that are described with regard to the conveying device can also be applied to the conveying system, and vice versa.

The use of magnetic levitation technology allows objects to be transported quickly and precisely. The direction of movement, speed of movement and acceleration of the mover can be controlled. For the conveying device to achieve high conveying rates, high accelerations and mover speeds are preferred. To prevent unwanted disengagement of the locking connection between the locking unit and the counter-locking unit even at such high accelerations or with abrupt changes in acceleration, it is proposed that a disengagement force acting against the locking direction can cause the locking unit and the counter-locking unit to disengage from each other, the disengagement force being greater than an acceleration force which is the product of the maximum acceleration of the mover in the conveying system in the locking direction and the sum of the mass of the conveying device and the mass of a maximum load on the receptacle. The maximum acceleration of the mover is determined by the conveying system designed using magnetic levitation technology, and can be measured by it.

The invention is explained in more detail below based on an exemplary embodiment with reference to the accompanying drawings. These show the following:

FIG. 1A schematic representation of a conveying system according to the invention with a conveying device according to the invention.

Figure 2A:
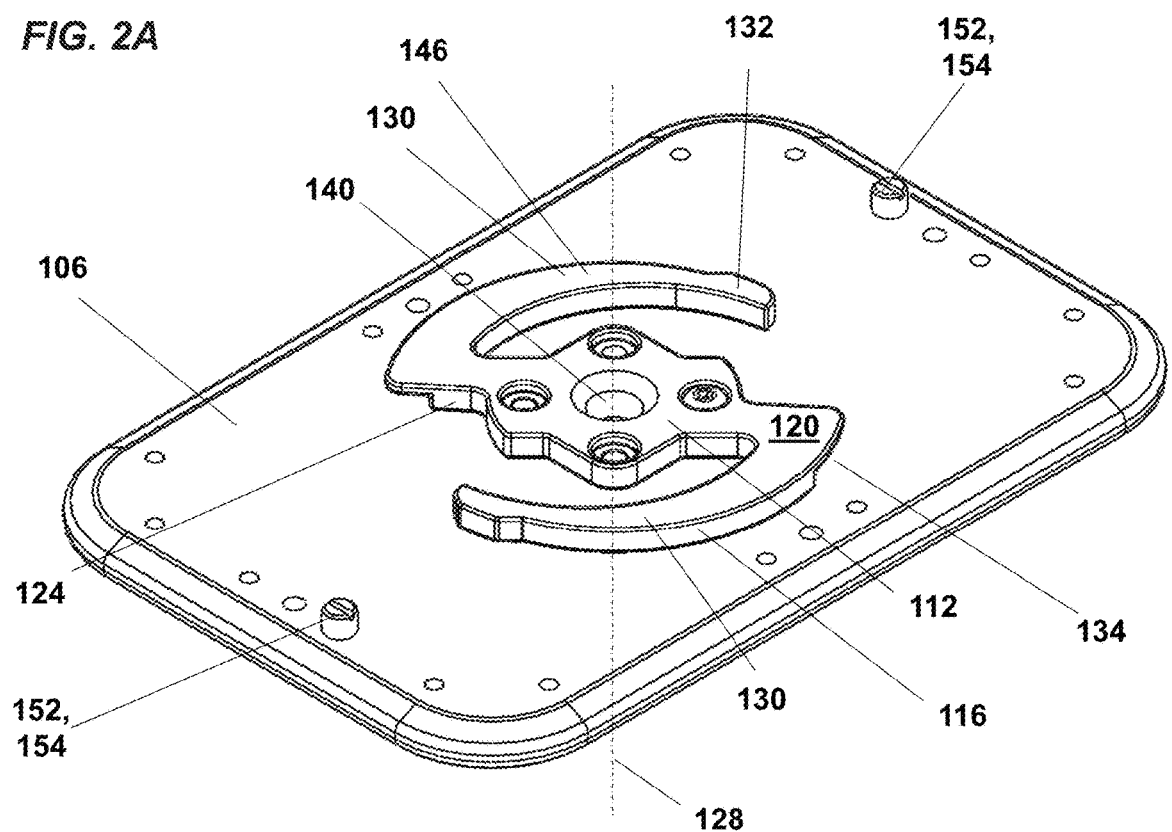
Figure 2B:
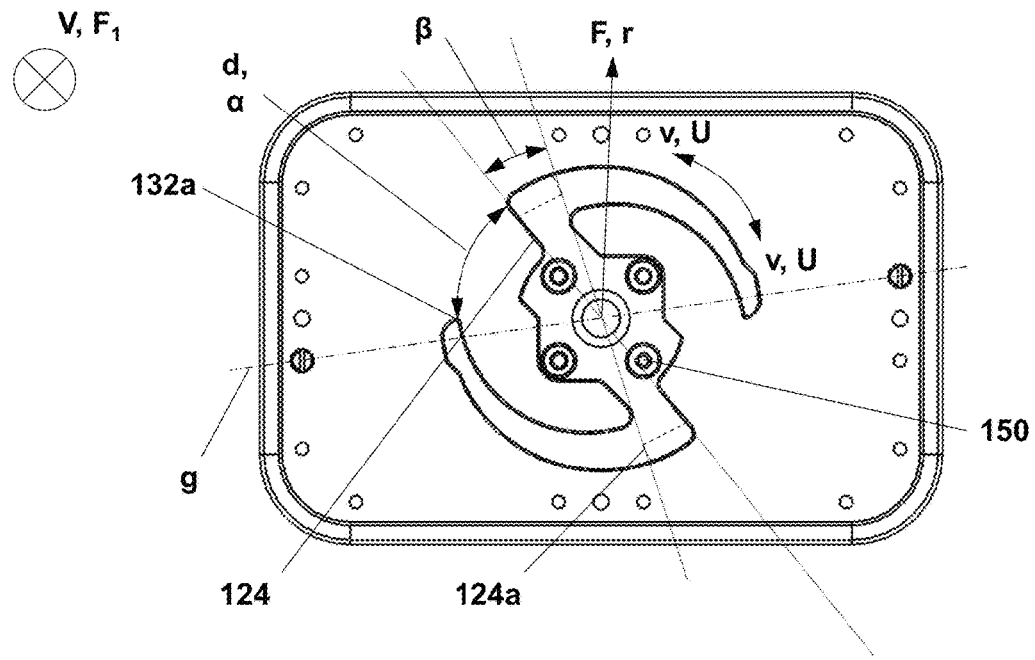

FIGS. 2A and 2B Views of a mover with a locking unit, and

Figure 3C:
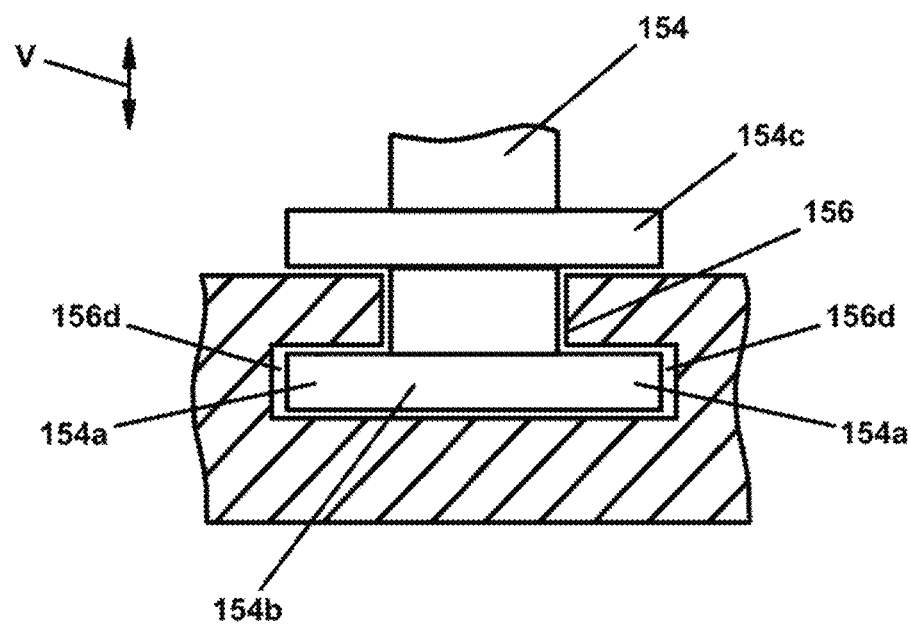
Figure 3A:
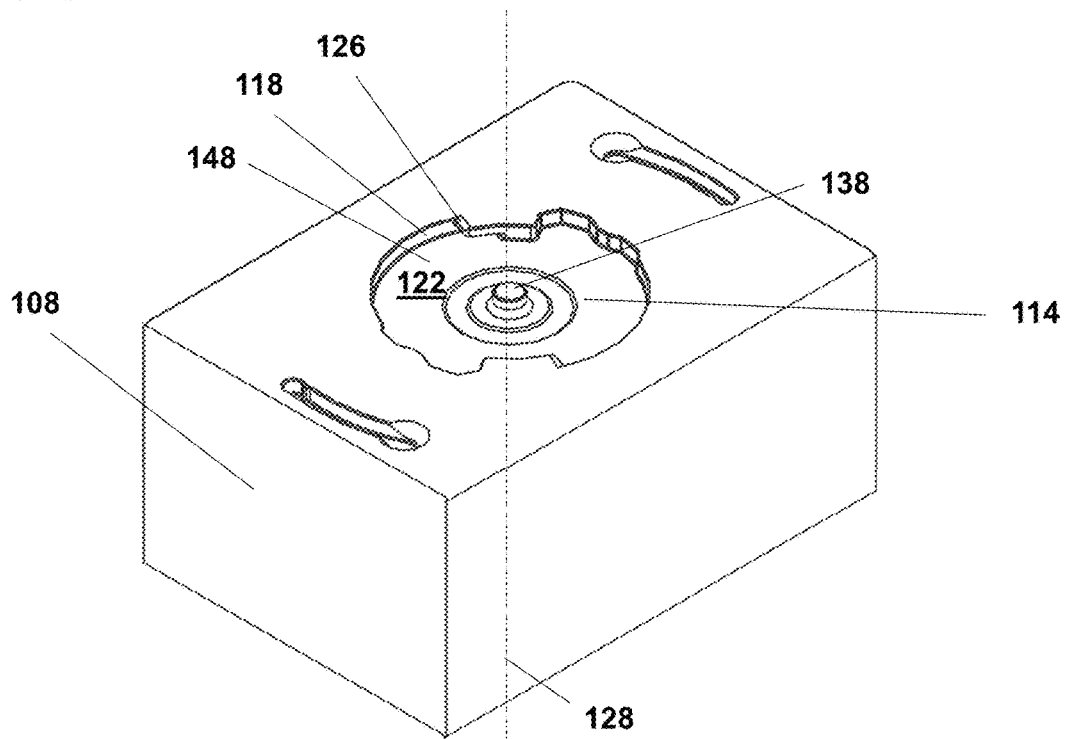
Figure 3B:
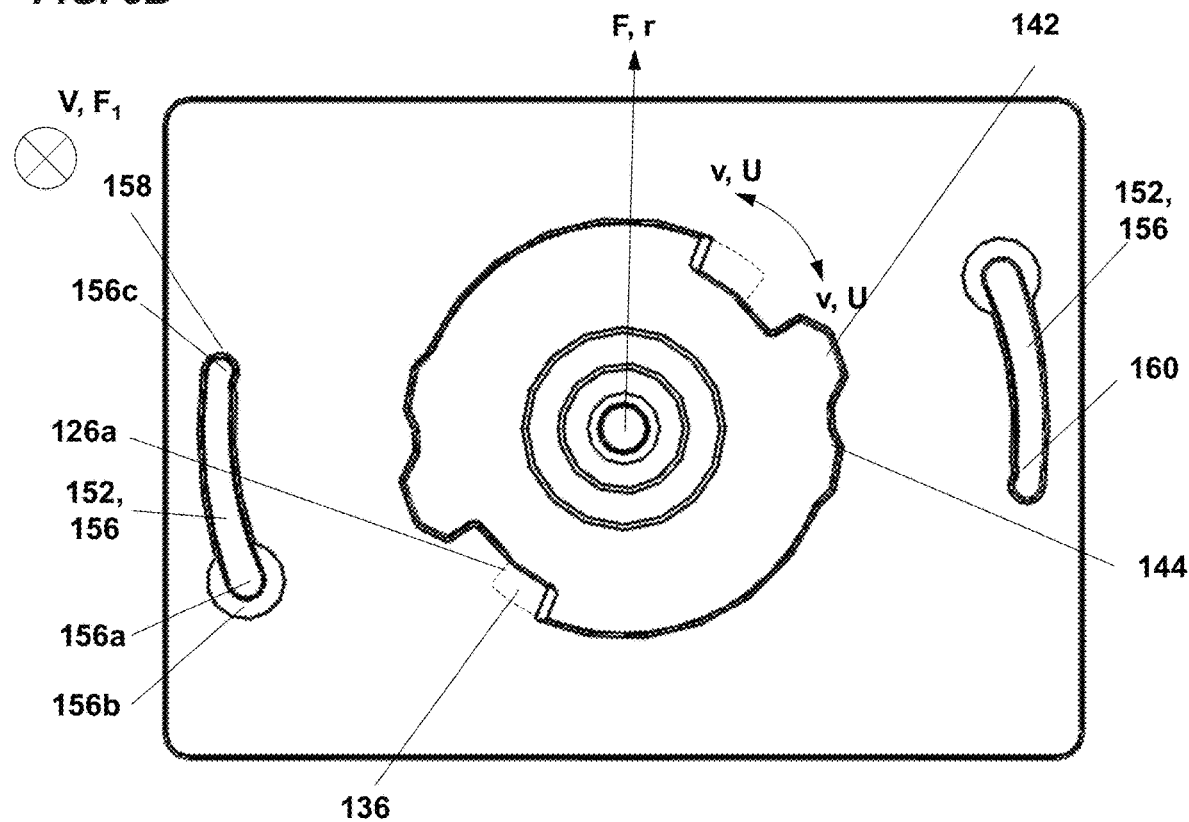

FIGS. 3A, 3B, and 3C Views of a receptacle with a counter-locking unit.

In FIG. 1, a conveying system designed using magnetic levitation technology is generally designated with the reference number 100. The conveying system 100 comprises a stator 102, which has a movement surface 102a, and a conveying device 104 according to the invention.

At this point, it should be noted that the conveying system 100 is not part of the conveying device 104 according to the invention.

The conveying device 104 comprises a mover 106 and a receptacle 108. The mover 106 can be moved relative to the movement surface 102a of the conveying system 100 in all three spatial directions, but predominantly parallel to the plane of the movement surface 102a in order to perform the conveying function.

The receptacle 108 can be connected to the mover 106 in a connecting direction V. Furthermore, the receptacle 108 serves to hold an object 110 also not belonging to the conveying device 104. The object 110 can be transported within the conveying system 100 by means of the conveying device 104.

To connect the mover 106 and the receptacle 108, the mover 106 comprises a locking unit 112 (see FIGS. 2A and 2B) and the receptacle 108 comprises a counter-locking unit 114 (see FIGS. 3A-3C). The locking unit 112 and the counter-locking unit 114 are adapted to be in locking engagement with one another in a locking direction v (see FIGS. 2B and 3B) with the mover 106 and the receptacle 108 in a connected state, as shown in FIG. 1.

The locking unit 112 further comprises at least one contact surface 116 and the counter-locking unit 114 comprises at least one counter-contact surface 118. In the connected state, the at least one contact surface 116 and the at least one counter-contact surface 118 are in form-fitting contact with one another in at least one form-fitting direction F, which is different from the locking direction v.

The at least one form-fitting direction F extends in a plane orthogonal to the connecting direction V. The locking direction v also extends in this plane orthogonal to the connecting direction V.

The locking direction v of the conveying device 104 of the present exemplary embodiment extends in the circumferential direction U with respect to the connecting direction V, while the form-fitting direction F extends in the radial direction r with respect to the connecting direction V. This prevents any unwanted relative movement of the mover 106 and receptacle 108 in the plane orthogonal to the connecting direction V, for example during translatory acceleration along the movement surface 102a of the conveying system 100.

In the connected state, the mover 106 and receptacle 108 lie against each other via at least one further contact surface 120 of the locking unit 112 and at least one further counter-contact surface 122 of the counter-locking unit 114. To secure the connection of the mover 106 and the receptacle 108 in the connecting direction V, the locking unit 112 comprises an undercut 134 and the counter-locking unit 114 comprises a counter-undercut 136. In the connected state, the undercut 134 and the counter-undercut 136 are in form-fitting engagement with one another. The connecting direction V thus forms a further form-fitting direction $F_1$.

To prevent the locking unit 112 from moving further in the locking direction v relative to the counter-locking unit 114 beyond the point where locking engagement has been reached, the locking unit 112 comprises at least one stop 124 and the counter-locking unit 114 comprises at least one counter-stop 126.

In the exemplary embodiment shown, the locking unit 112 or the counter-locking unit 114 have a 2-fold rotational symmetry about an axis of rotation 128 (shown as a dash-dotted line in FIG. 2A). However, they can generally have an n-fold rotational symmetry about the axis of rotation 128, where n is a positive integer. In particular, the locking unit 112 comprises two locking arms 130, each with a locking nose 132. An end 132a on the locking nose side is arranged at a predetermined distance d from an adjacent stop 124 of the adjacent locking arm 130. The distance d extends over an angle α of approximately 30° (360°/6n where n=2) to approximately 45° (360°/4n where n=2) about the axis of rotation 128.

An undercut 134 may be provided on each of the locking arms 130. The undercut 134 extends around the axis of rotation 128 about an angle β. The angle β is less than or equal to the angle α of the distance d around the axis of rotation 128.

To support the interaction of the at least one stop 124 and the at least one counter-stop 126, the locking unit 112 may comprise a further stop 124a and the counter-locking unit 114 may comprise a further counter-stop 126a. The further stop 124a is arranged on the undercut 134 and the further counter-stop 126a on the counter-undercut 136. The further stop and the further counter-stop 126a run substantially orthogonally to the circumferential direction U.

To bring the locking unit 112 and the counter-locking unit 114 into locking engagement with one another and to connect them, the receptacle 108 is placed on the mover 106 slightly offset in the circumferential direction U, so that the counter-undercut 136 is positioned at the distance d between a locking arm 130 and an adjacent stop 124. Locating the respective axes of rotation 128 of the receptacle 108 and mover 106 can be made easier by providing a positioning projection 138 on one unit, in this case the counter-locking unit 114, and a corresponding positioning recess 140 on the other unit, in this case the locking unit 112. The axis of rotation 128 in the connected state preferably extends through the positioning projection 138 and through the positioning recess 140. If the positioning projection 138 and the positioning recess 140 are each provided in a centroid of the mover 106 and the receptacle 108 respectively, the receptacle 108 can be positioned centrally on the mover 106 in the connected state.

To make it easier to bring the mover 106 (FIG. 2A) and receptacle 108 (FIG. 3A) together, the unit without a locking arm 130, in this case the counter-locking unit 114, can have a recess 142 which is adapted to receive the locking nose 132 when the mover 106 and receptacle 108 are in an unlocked but already connected state.

When the further contact surface 120 of the locking unit 112 and the counter-contact surface 122 of the counter-locking unit 114 are in contact with one another, the receptacle 108 or the mover 106 is rotated in the locking direction v such that the locking unit 112 and the counter-locking unit 114 enter into locking engagement with one another. Here, the locking nose 132 moves out of the recess 142 until it lies against a locking stop 144 and the locking unit 112 and the counter-locking unit 114 engage with each other. Since, in the present exemplary embodiment, the locking direction v extends in the circumferential direction U, the receptacle 108 is rotated relative to the mover 106 about the axis of rotation 128, in this case clockwise, in order to bring the locking unit 112 and the counter-locking unit 114 into locking engagement with one another.

At the latest when the locking unit 112 and the counter-locking unit 114 are in locking engagement with one another, the at least one contact surface 116 and the at least one counter-contact surface 118 are also in form-fitting contact with one another. If the at least one contact surface 116 and the at least one counter-contact surface 118 are already in contact with each other when the receptacle 108 is arranged offset relative to the mover 108, the counter-contact surface 118 guides the movement of the contact surface 116 during the process of bringing into locking engagement, or vice versa.

Each of the locking arms 130 lies with a contact surface 116 in the radial form-fitting direction F in a form-fitting manner against a counter-contact surface 118. Together with the locking engagement of the locking unit 112 and the counter-locking unit 114 in the locking direction v in the circumferential direction U, this prevents unwanted disengagement of the mover 106 and the receptacle 108 from each other in the plane extending orthogonally to the connecting direction. The interaction of the undercut 134 and the counter-undercut 136 and the resulting form-fitting connection in the further form-fitting direction $F_1$ prevents unwanted disengagement of the mover 106 and the receptacle 108 in all spatial directions.

The transition to the connected state is further facilitated because the locking unit 112 is configured as a projection 146 projecting from the mover 106 and the counter-locking unit 114 is configured as a recess 148 in the receptacle 108. In the connected state, the projection 146 is at least partially received in the recess 148. As can be seen from FIG. 3A, in the present exemplary embodiment the counter-locking unit 114 is integrally connected to the receptacle 108. And according to FIG. 2A, the locking unit 112 can be operationally stably connected to the mover 106. At least a plurality of connecting elements 150, for example screws, are provided for this purpose.

Furthermore, the conveying device 104 has at least one further locking unit 152. The at least one further locking unit 152 comprises a guide projection 154 and a guide groove 156. The guide groove 156 is adapted to receive the guide projection 154. According to the present exemplary embodiment, one of the guide elements, namely the guide projection 154, is arranged on the mover 106 and the other of the guide elements, namely the guide groove 156, is arranged on the receptacle 108.

If only the mover 106 and the receptacle 108 are arranged offset relative to one another, firstly the projection 146 is at least partially received by the recess 148. Secondly, the guide projection 154 enters the guide groove 156, namely at an insertion end 156a. This is facilitated by the guide groove 156 having a lead-in chamfer 156b at the insertion end 156a.

The guide groove 156 is shaped so that the relative movement of the guide projection 154 and the guide groove 156 is equal to the relative movement of the receptacle 108 and the mover 106. Therefore, the guide groove 156 is shaped like an arc of a circle, with the center of the arc lying on the axis of rotation 128.

Furthermore, the guide groove 156 has a stop 158 at an end 156c pointing away from the insertion end 156a. The stop 158 is adapted to lie, in the connected state, against the guide projection 154 in the locking direction v. Further movement of the guide projection 154 away from the insertion end 156a is prevented by the stop 158.

In addition to the stop 124 and the stop 124a, the stop 158 is therefore another stop acting in the circumferential direction.

The guide projection 154 is secured in the position in which it lies against the stop 158 by a locking indentation 160. Here, the guide projection 154 lies both against the stop 158 and against the locking indentation 160.

The elasticity of a locking arm 130 required for locking can lead to the disengagement of the at least one form-fitting connection. To counteract this, the guide projection 154 and the locking nose 132 can lie on a straight line g (shown in FIG. 2B by means of a dash-dotted line), the straight line g intersecting the axis of rotation 128.

With regard to the conveying system 100 shown in FIG. 1, designed using magnetic levitation technology, it should also be added that a disengagement force acting against the locking direction v must be exerted to disengage the locking unit 112 and the counter-locking unit 114 from each other. The disengagement force is greater than the acceleration force which is the product of the maximum acceleration of the mover 106 in the conveying system 100 in the locking direction v, for example 30 m/s$^2$, and the sum of the mass of the conveying device 104 and the mass of a maximum load on the receptacle 108. Maximum load refers to the maximum number of objects 110 of a given type.

As shown in FIG. 3C, the guide groove 156 can also be undercut on one or both sides. One or two shoulders 154a of the guide projection 154 can engage in these undercuts 156d. If desired, the two shoulders 154a can be part of a plate-like attachment 154b of the guide projection 154. In the area of the lead-in chamfer 156b, the guide groove 156 must be widened accordingly to allow the shoulder(s) 154a or the plate 154b to be inserted.

The interaction of the undercuts 156d and the shoulders 154a helps the undercut 134 and the counter-undercut 136 to prevent unintentional disengagement of the mover 106 and the receptacle 108 in the connecting direction V.

To improve the guidance of the guide projection 154 in the guide groove 156, the guide projection 154 can also have a second plate 154c, which is arranged outside the guide groove 156, so that the edges of the guide groove 156 are accommodated between the two plates 154b, 154c.

The invention claimed is:

1. A conveying device for an object not belonging to the conveying device, comprising:
   a mover of a conveying system designed using magnetic levitation technology and not belonging to the conveying device, the mover being movable relative to a movement surface of the conveying system;
   a receptacle configured to be connected to the mover in a connecting direction and to receive the object, wherein the mover comprises a locking unit and the receptacle comprises a counter-locking unit;
   wherein the locking unit and the counter-locking unit are adapted to be in locking engagement with one another in a locking direction with the mover and the receptacle in a connected state; and
   wherein the locking unit comprises at least one contact surface and the counter-locking unit comprises at least one counter-contact surface, and wherein, in the connected state, the contact surface and the counter-contact surface are in form-fitting contact with one another in at least one form-fitting direction which is different from the locking direction.

2. The conveying device of claim 1, wherein the at least one form-fitting direction extends in a plane orthogonal to the connecting direction.

3. The conveying device of claim 2, wherein the locking direction extends in the plane orthogonal to the connecting direction.

4. The conveying device of claim 1, wherein the locking unit comprises at least one further contact surface and the counter-locking unit comprises at least one further counter-contact surface, and wherein, in the connected state, the at least one further contact surface and the at least one further counter-contact surface are in form-fitting contact with one another in a further form-fitting direction which is different both from the locking direction and from the form-fitting direction.

5. The conveying device of claim 1, wherein, with respect to the connecting direction, the locking direction extends in a circumferential direction and the form-fitting direction extends in a radial direction.

6. The conveying device of claim 1, wherein the locking unit comprises at least one stop and the counter-locking unit comprises at least one counter-stop, wherein the at least one stop and the at least one counter-stop are adapted to interact in the connected state.

7. The conveying device of claim 1, wherein one of the locking unit or the counter-locking unit has an n-fold rotational symmetry about an axis of rotation, where n is a natural number greater than or equal to 1, and wherein the one of the locking unit or the counter-locking unit comprises n locking arms each having a locking nose.

8. The conveying device of claim 1, wherein one of the locking unit or the counter-locking unit is configured as a projection, and the other of the counter-locking unit or the locking unit is configured as a recess, the projection being at least partially received in the recess in the connected state.

9. The conveying device of claim 1, wherein the conveying device comprises at least one further locking unit comprising a guide projection and a guide groove adapted to receive the guide projection, and wherein one of the guide projection or the guide groove is arranged on the mover, and the other of the guide groove or the guide projection is arranged on the receptacle.

10. The conveying device of claim 9, wherein the guide groove has, at an end pointing away from an insertion end, a stop which is adapted to lie against the guide projection in the connected state.

11. The conveying device of claim 9, wherein one of the locking unit or the counter-locking unit has an n-fold rotational symmetry about an axis of rotation, where n is a natural number greater than or equal to 1;
   wherein the one of the locking unit or the counter-locking unit comprises n locking arms each having a locking nose; and
   wherein the guide projection and the locking nose lie on a straight line, the straight line intersecting the axis of rotation.

12. The conveying device of claim 1, wherein the locking unit or the receptacle is made of an electrically non-conductive and non-magnetizable material.

13. The conveying device of claim 12 wherein the locking unit or the receptacle is made of plastic.

14. The conveying device of claim 11 wherein an end of the straight line closer to the locking nose than the guide projection is arranged at a predetermined distance from an adjacent stop or adjacent counter-stop of the unit.

15. The conveying device of claim 14 wherein the predetermined distance extends over an angle of approximately 360°/6n to approximately 360°/4n about the axis of rotation.

16. The conveying device of claim 10 wherein a locking indentation is formed in the guide groove upstream of the stop.

17. A conveying system designed using magnetic levitation technology comprising:
- a stator which has a movement surface; and
- a conveying device comprising:
  - a mover comprises a locking unit and being movable relative to the movement surface;
  - a receptacle configured to be connected to the mover in a connecting direction and to receive an object, wherein the receptacle comprises a counter-locking unit;
  - wherein the locking unit and the counter-locking unit are adapted to be in locking engagement with one another in a locking direction with the mover and the receptacle in a connected state; and
  - wherein the locking unit comprises at least one contact surface and the counter-locking unit comprising at least one counter-contact surface, and wherein, in the connected state, at least one contact surface and the at least one counter-contact surface are in form-fitting contact with one another in at least one form-fitting direction which is different from the locking direction.

18. The conveying system according to claim 17, wherein a disengagement force acting against the locking direction causes the locking unit and the counter-locking unit to disengage from each other, the disengagement force being greater than an acceleration force which is a product of the maximum acceleration of the mover in the conveying system in the locking direction and a sum of a mass of the conveying device and a mass of a maximum load on the receptacle.

19. A conveying device for an object not belonging to the conveying device, comprising:
- a mover of a conveying system designed using magnetic levitation technology and not belonging to the conveying device, the mover being movable relative to a movement surface of the conveying system;
- a receptacle configured to be connected to the mover in a connecting direction and to receive the object, wherein the mover comprises a locking unit and the receptacle comprises a counter-locking unit;
- wherein the locking unit and the counter-locking unit are adapted to be in locking engagement with one another in a locking direction with the mover and the receptacle in a connected state;
- wherein the locking unit comprises at least one contact surface and the counter-locking unit comprises at least one counter-contact surface, and wherein, in the connected state, the contact surface and the counter-contact surface are in form-fitting contact with one another in at least one form-fitting direction which is different from the locking direction; and
- wherein one of the counter-locking unit or the locking unit comprises an undercut and the other of the locking unit or the counter-locking unit comprises a counter-undercut, wherein in the connected state the undercut and the counter-undercut engage with each other in the connecting direction.

20. The conveying device of claim 19, wherein one of the locking unit or the counter-locking unit has an n-fold rotational symmetry about an axis of rotation, where n is a natural number greater than or equal to 1;
- wherein the one of the locking unit or the counter-locking unit comprises n locking arms each having a locking nose; and
- wherein the undercut or the counter-undercut is provided on at least one of the n locking arms, with the undercut or the counter-undercut extending over an angle about the axis of rotation that is smaller than or equal to an angle of a distance about the axis of rotation.

* * * * *